United States Patent [19]
Puig et al.

[11] 3,933,701
[45] Jan. 20, 1976

[54] HIGH RESILIENCE POLYURETHANE FOAM
[75] Inventors: John E. Puig, Wallingford; Ralph A. Colafati, III, New Haven, both of Conn.
[73] Assignee: Olin Corporation, New Haven, Conn.
[22] Filed: Jan. 29, 1975
[21] Appl. No.: 545,255

[52] U.S. Cl. .................. 260/2.5 AT; 260/2.5 AG; 260/2.5 AP; 260/2.5 BG
[51] Int. Cl.² ......................................... C08G 18/14
[58] Field of Search .... 260/2.5 AT, 2.5 AG, 2.5 BG

[56] References Cited
UNITED STATES PATENTS

| | | | |
|---|---|---|---|
| 3,255,226 | 6/1966 | McShane, Jr. | 260/453 |
| 3,281,447 | 10/1966 | Knopf et al. | 260/453 |
| 3,878,235 | 4/1975 | Schnabel et al. | 260/453 AM |

*Primary Examiner*—H. S. Cockeram
*Attorney, Agent, or Firm*—James B. Haglind; Donald F. Clements; T. P. O'Day

[57] ABSTRACT

Selected methylene-bridged diaryl polyisocyanates are used as stabilizers in the production of high resilience polyurethane foam.

17 Claims, No Drawings

HIGH RESILIENCE POLYURETHANE FOAM

This invention relates to the preparation of flexible polyurethane foam. More particularly, the invention relates to an improvement in the preparation of high resilience polyurethane foam.

It is known to prepare a polyurethane foam by reacting various aromatic and aliphatic-aromatic polyisocyanates with a polyol or mixture of polyols. Also, it has been generally known that polyurethane foam having reduced combustibility can be achieved by utilizing in its preparation a chlorinated polyisocyanate. However, according to the prior art, chlorine-containing aromatic and aliphatic-aromatic polyisocyanates generally are either very viscous liquids or, as is more often the case, solid. As such, their use in polyurethane foam production, if at all practicable, entails costly and burdensome handling and processing measures which often render them unfeasible from an economic standpoint. For exsample, U.S. Pat. No. 3,360,539 discloses that the product of chlorinating an 80/20 isomer mixture 2,4- and 2,6-toluenediisocyanate is solid at room temperature. U.S. Pat. No. 2,945,875, which relates to the preparation of monochloro- and dichloro-phenylene diisocyanate, again indicates that these chlorinated products are solid at room temperature.

It is further known in the art to prepare certain monomeric methylene-bridged diaryl polyisocyanates by condensing an aromatic or aliphatic aromatic isocyanate with selected aromatic compounds having a halomethyl substituent and which may also have one or more chlorine substituents on the aromatic ring. See U.S. Pat. No. 3,255,226. The products of the process of that patent, which are described as being solid or viscous liquids, are said to be of utility generally in the preparation of polyurethane foam.

In addition, it is known, in the art of making flexible polyurethane foam, that the use of highly reactive foam-forming formulations, incorporating a highly reactive organic polyisocyanate and a high-molecular-weight polyol having a certain level of primary hydroxy groups, yields a foam with improved resilience and other desirable physical properties. Such a foam has come to be referred to in the art as a "high resilience" foam.

Due to the highly reactive nature of the reaction mixture from which these high resilience foams are prepared, such foams are characteristically unstable. This is particularly true for foams having a density below 2.0 lbs. per cubic foot. Consequently, in the absence of a curing agent these foams usually succumb to substantial shrinkage or collapse shortly after the foaming reaction is completed and before they have become fully cured.

Now it has been found, according to the present invention, that high resilience polyurethane foams can be stabilized against shrinkage and collapse by incorporating in the foam-forming reaction mixture a certain proportion of a highly select group of liquid methylene-bridged diaryl polyisocyanates which, along with their low toxicity, are surprisingly of low viscosity and relatively high reactivity.

Foams prepared from a reaction mixture containing these polyisocyanates, while exhibiting all the desirable properties of high resilience foam, are not susceptible to substantial shrinkage even in the absence of a curing catalyst. The methylene-bridged diaryl polyisocyanates are particularly effective in the stabilization of high resilience foams having a density below 2.0 lbs. per cubic foot. As such, they are of utility in a variety of cushioning and upholstering applications, particularly in the production of molded automotive seats.

The methylene-bridged diaryl polyisocyanates which are employed as stabilizers in the process of the invention are represented by formula I as follows:

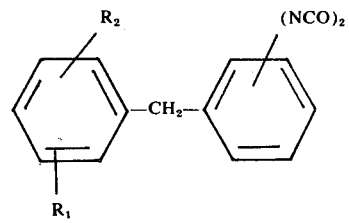

wherein $R_1$ is NCO or halogen, and
$R_2$ is H or alkyl of 1–4 carbon atoms, with the proviso that when $R_1$ is halogen, $R_2$ is an alkyl of 1–4 carbon atoms.

The following compounds, and mixtures thereof, are illustrative of the stabilizing polyisocyanates represented by formula I.

2,4-diisocyanato-2'-isocyanatophenyl-methane
2,6-diisocyanato-2'-isocyanatophenyl-methane
3,5-diisocyanato-2'-isocyanatophenyl-methane
2,4-diisocyanato-4'-isocyanatophenyl-methane
2,6-diisocyanato-4'-isocyanatophenyl-methane
2,4-diisocyanato-2'-isocyanato-5'-methylphenyl-methane
2,4-diisocyanato-4'-isocyanato-3'-methylphenyl-methane
2,6-diisocyanato-4'-isocyanato-2'-methylphenyl-methane
2,6-diisocyanato-2'-isocyanato-3'-methylphenyl-methane
2,6-diisocyanato-2'-isocyanato-5'-ethylphenyl-methane
2,4-diisocyanato-2'-isocyanato-3'-ethylphenyl-methane
2,6-diisocyanato-4'-isocyanato-3'-ethylphenyl-methane
2,4-diisocyanato-4'-isocyanato-2'-ethylphenyl-methane
2,4-diisocyanato-2'-isocyanato-5'-propylphenyl-methane
2,6-diisocyanato-4'-isocyanato-3'-butylphenyl-methane
2,4-diisocyanato-4'-chloro-3'-methyl-diphenyl-methane
2,6-diisocyanato-4'-chloro-3'-methyl-diphenyl-methane
2,4-diisocyanato-5'-bromo-2'-methyl-diphenyl-methane
2,6-diisocyanato-5'-chloro-2'-methyl-diphenyl-methane
2,6-diisocyanato-5'-chloro-2'-ethyl-diphenyl-methane
2,4-diisocyanato-5'-chloro-2'-ethyl-diphenyl-methane
2,4-diisocyanato-4'-bromo-3'-ethyl-diphenyl-methane
2,6-diisocyanato-4'-chloro-3'-propyl-diphenyl-methane 2,4-diisocyanato-4'-chloro-3'-propyl-diphenyl-methane
2,4-diisocyanato-5'-chloro-2'-butyl-diphenyl-methane
2,6-diisocyanato-5'-chloro-2'-butyl-diphenyl-methane Preferred methylene-bridged diaryl polyisocyanates for use according to the invention are those represented by formulas II and III as follows:

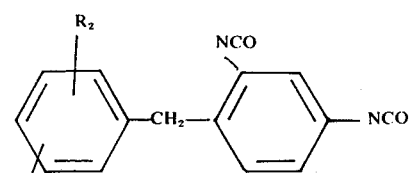

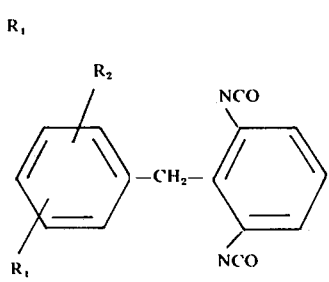

wherein, as applied to each of formulas II and III,
R₁ is NCO or chlorine and
R₂ is H, methyl or ethyl with the proviso that when R₁ is chlorine, R₂ is ethyl or methyl.

Illustrative examples of preferred methylene-bridged diaryl polyisocyanates include any of the following and mixtures thereof:
2,4-diisocyanato-2'-isocyanatophenyl-methane
2,6-diisocyanato-2'-isocyanatophenyl-methane
2,4-diisocyanato-4'-isocyanatophenyl-methane
2,6-diisocyanato-4'-isocyanatophenyl-methane
2,4-diisocyanato-2'-isocyanato-5'-methylphenyl-methane
2,4-diisocyanato-4'-isocyanato-3'-methylphenyl-methane
2,6-diisocyanato-4'-isocyanato-2'-methylphenyl-methane
2,6-diisocyanato-2'-isocyanato-3'-methylphenyl-methane
2,6-diisocyanato-2'-isocyanato-5'-ethylphenyl-methane
2,4-diisocyanato-2'-isocyanato-3'-ethylphenyl-methane
2,6-diisocyanato-4'-isocyanato-3'-ethylphenyl-methane
2,4-diisocyanato-4'-isocyanato-2'-ethylphenyl-methane
2,4-diisocyanato-4'-chloro-3'-methyl-diphenyl-methane
2,6-diisocyanato-4'-chloro-3'-methyl-diphenyl-methane
2,4-diisocyanato-5'-chloro-2'-methyl-diphenyl-methane
2,6-diisocyanato-5'-chloro-2'-methyl-diphenyl-methane
2,6-diisocyanato-5'-chloro-2'-ethyl-diphenyl-methane
2,4-diisocyanato-5'-chloro-2'-ethyl-diphenyl-methane
2,4-diisocyanato-4'-chloro-3'-ethyl-diphenyl-methane It is particularly preferred to employ isomeric mixtures of the polyisocyanates represented by formulas II and III. Illustrative such mixtures include:
a mixture of 2,4- and 2,6-diisocyanatophenyl-isocyanatophenyl-methane,
a mixture of 2,4- and 2,6-diisocyanatophenyl-chloromethylphenyl-methane, and
a mixture of 2,4- and 2,6-diisocyanatophenyl-chloroethylphenyl-methane.

The methylene-bridged diaryl polyisocyanates used in the method of the invention can be prepared by condensing, at a temperature of about 50–250°C and in the presence of a Friedel-Crafts catalyst, one mole of a substituted benzene with one mole of α-chlorotoluene diisocyanate. This condensation reaction is illustrated by the following equation:

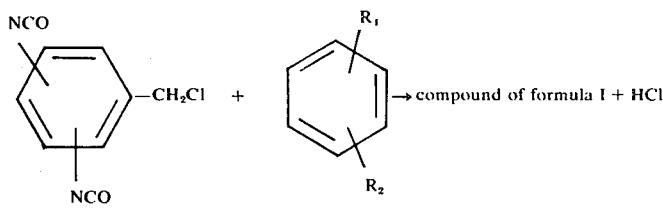

wherein R₁ and R₂ have the significance indicated above.

Completion of the reaction, which is preferably carried out using a large stoichiometric excess of the substituted benzene, is indicated when no more hydrogen chloride is evolved. The methylene-bridged diaryl polyisocyanate products is then recovered by conventional distillation methods. A more detailed description of this type of condensation reaction is provided in the above-noted U.S. Pat. No. 3,255,226 which issued June 7, 1966 to H. F. McShane. The entire disclosure of this patent is incorporated herein by reference.

Illustrative of the substituted benzenes which may be employed in preparing the methylene-bridged diaryl polyisocyanates are the following:
phenyl isocyanate
toluene isocyanate
ethyl benzene isocyanate
propyl benzene isocyanate
butyl benzene isocyanate
o-chlorotoluene
m-chlorotoluene
p-chlorotoluene o-ethylchlorobenzene
m-ethylchlorobenzene
p-propylchlorobenzene
o-butylchlorobenzene As noted above, the other reactant which is employed in preparing the methylene-bridged diaryl polyisocyanates is α-chlorotoluene diisocyanate. Any isomer, or mixture of isomers, of this compound may be used such as α-chloro-2,4-toluene diisocyanate, α-chloro-2,6-toluene diisocyanate, α-chloro-2,5-toluene diisocyanate, α-chloro-3,5-toluene diisocyanate, and mixtures thereof.

It is to be noted that the product of the condensation reaction is quite often a mixture of isomers which vary in proportion relative to one another. This is true even in the case where a single isomer of α-chlorotoluene diisocyanate is condensed with a single substituted benzene isomer; for inasmuch as the condensation could take place via any one of the available carbons on the substituted benzene ring, it follows for example that as many as four isomers could result when four molecules of the α-chlorotoluene diisocyanate are condensed with four molecules of a meta-substituted benzene. It is thus apparent that, as used in the specification and claims herein, formulas II and II above are intended to include isomeric mixtures as well as single isomers of the compounds encompassed by those formulas.

Except for the inclusion or use, pursuant to the invention, of a stabilizing polyisocyanate as described above, the preparation of polyurethane foam is achieved using prior art high resilience foam forming formulations. These comprise various combinations of polyether polyols, organic isocyanates, foaming agents and reaction catalysts.

The polyether polyol is one that is characterized by (1) a molecular weight of at least about 4,000, (2) a polyfunctional alcohol nucleus, (3) polyoxyalkylene chain segments attached through one end thereof to the nucleus, and (4) a ratio of primary to secondary hydroxyl end groups ranging from about 1.5:1 to about 5.5:1. This polyether can be prepared by methods generally well known in the art wherein a polyfunctional alcohol initiator is condensed, in the presence of an alkaline catalyst, first with an alkylene oxide having 3 or more carbon atoms and then with ethylene oxide.

The alcohol initiator which is used to prepare the polyether polyol can be any compound having 2–8 hydroxyl groups. Illustrative are ethylene glycol, propylene glycol, the butylene glycols such as 1,3-butylene glycol, the pentane diols such as 1,5-pentane diol, the hexane diols such as 1,6-hexane diol, glycerol, trimethylolpropane, sorbitol, pentaerythritol, methyl glucoside, sucrose, mixtures thereof and the like. It is preferred, however, to employ an aliphatic polyol having 2–4, and more preferably 3–4, hydroxyl groups, such as ethylene glycol, propylene glycol, glycerol, trimethylolpropane, sorbitol, and the like. The most preferred initiators are the aliphatic triols such as glycerol and trimethylolpropane.

In preparing the polyether polyol, a polyhydric alcohol initiator as described above is sequentially condensed, in the presence of an alkaline catalyst such as potassium hydroxide, first with an alkylene oxide having 3–8, and preferably 3–4, carbon atoms and then ethylene oxide. Illustrative of the alkylene oxides which are first condensed with the alcohol initiator are propylene oxide, butylene oxide, pentylene oxide, mixtures thereof and the like, propylene oxide being most preferred. In carrying out the sequential condensation reactions, such amounts of ethylene oxide and higher alkylene oxide are employed as to provide a polyether having a molecular weight of at least about 4,000, and preferably from about 4,500 to about 7,000, and in which polyether the ratio of primary to secondary hydroxyl groups is from about 1.5:1 to about 5.5:1 and preferably from about 2:1 to about 5:1.

In accordance with a particularly preferred embodiment of the invention, the polyether polyol which is employed in preparing the polyurethane foam is an oxypropylated, oxyethylated aliphatic triol having a molecular weight of about 4,500–6,600 and a ratio of primary to secondary hydroxyl groups from about 3:1 to about 4.5:1.

In preparing the foams of the invention, any suitable organic polyisocyanate, or a mixture of polyisocyanates, may be employed as the main isocyanate reactant. Illustrative are toluene diisocyanate, such as the 80:20 and the 65:35 mixtures of the 2,4- and 2,6-isomers, ethylene diisocyanate, propylene diisocyanate, methylenebis(4-phenyl) isocyanate, 3,3'-ditoluene-4,4'-diisocyanate, hexamethylene diisocyanate, naphthalene-1,5-diisocyanate, mixtures thereof and the like. In accordance with a particularly preferred embodiment of the invention, an isomeric mixture of 2,4- and 2,6-toluene diisocyanate is employed in which the weight ratio of the 2,4-isomer to the 2,6-isomer is from about 60:40 to about 90:10 and more preferably from about 65:35 to about 80:20.

As indicated, along with the main organic polyisocyanate reactant, a methylene-bridged diaryl polyisocyanate as described above is employed in making the high resilient foams of the invention. Pursuant to the invention, the methylene-bridged diaryl polyisocyanate may be used in any suitable proportion which is effective in stabilizing the foam and providing other desirable foam characteristics without otherwise interfering with the foaming reaction or detrimentally altering the properties of the resulting foam. For example, from about 0.01 to about 10 and preferably from about 1 to about 5 parts by weight of the methylene-bridged diaryl polyisocyanate are employed per 100 parts of polyol.

The total amount of polyisocyanates, including the main polyisocyanate reactant and the stabilizing methylene-bridged diaryl polyisocyanate, that is employed should generally be sufficient to provide at least 0.7 NCO group per hydroxyl group in the reaction system, which includes the polyether polyol, as well as any additional material and/or foaming agent present in the system. In practice a total amount of main isocyanate reactant and the stabilizing isocyanate is usually employed as to provide no more than about 1.25, and preferably about 0.9–1.15 NCO groups per each hydroxyl group.

Any suitable foaming agent, or mixture of foaming agents, may be employed in preparing the polyurethane foam. These include inorganic foaming agents, such as water, and organic foaming agents containing up to seven carbon atoms, such as the halogenated hydrocarbons and the low molecular weight alkanes, alkenes, and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether and diisopropyl ether. Water and the low molecular weight polyhalogenated alkanes, such as monofluorotrichloromethane and dichlorodifluoromethane, are preferred. The amount of foaming agent may be varied within a reasonably wide range as is well known in the art. Generally, however, the halogenated alkanes, for example, are employed in an amount of about 2–20 parts per 100 parts by weight of the polyether polyol; and water is employed in an amount of about 1–6 parts per 100 parts by weight of the polyether polyol.

The catalyst employed in preparing the foams of the invention may be any of the catalysts known to be useful for this purpose, including tertiary amines, organometallic salts, and mixtures of an organo-metallic salt with one or more tertiary amine, the latter being preferred. Typical tertiary amines include, for example, triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark Niax A-1, methyldicyclohexylamine, N-cyclohexylmorpholine, dimethylcyclohexylamine, methyldiethanolamine, mixtures of dimethylcyclohexylamine and 2(3-pentyl)-1-dimethylaminocyclohexane such as may be purchased commercially under the trademark Polycat, bis(dimethylaminoethylpropylether), mixtures of triethylene diamine and dipropylene glycol such as the 1:2 and 1:4 weight ratio mixtures which may be purchased commercially under the trademarks Dabco 33LV and Dabco 8020, respectively, bis(dimethylaminopropylether), and mixtures of these catalysts. The preferred tertiary amine catalysts are triethylenediamine, mixtures of triethylenediamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.1–1.5, and preferably about 0.25–0.75, parts per 100 parts by weight of the total polyol which is employed in preparing the foam.

Typical organo-metallic salts include for example, the salts of tin, titanium, antimony, aluminum, cobalt, zinc, bismuth, lead, and cadmium, the tin salts, i.e., stannic and stannous salts, being preferred. Illustratively, such salts include the octoates, dilaurates, diacetates, dioctoates, oleates, and neodeconates of these metals, the octoates being preferred. The organo-metallic salt catalyst is used in a proportion of about 0–0.5, and preferably about 0.05–0.2, parts per 100 parts by weight of total polyol which is employed in the preparation of the foam.

It is preferred in the preparation of the polyurethane foams of the invention to employ minor amounts of a conventional surfactant in order to further improve the cell structure of the polyuretnane foam. Suitable such surfactants include for example, the silicon-based surfactants such as the silicones and the siloxaneoxyalkylene block co-polymers, all of which are commercially available materials.

Generally the silicones are employed in a proportion of up to about 0.1 parts per 100 parts by weight of the polyether polyol; and the siloxaneoxyalkylene block co-polymers are employed in a porportion of up to about 2 parts per 100 parts by weight of the polyether polyol.

If desired a curing agent, such as a conventional amine curing agent, may be included in the foam forming reaction mixture. However, in accordance with the invention, the use of curing agents is not necessary and therefore it is preferable to exclude such materials from the reaction mixture.

Various additives can also be employed to provide different properties in the polyurethane foam e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants, antioxidants and flame retardants may be added.

In the practice of this invention, a polyurethane foam forming reaction mixture comprising the above-described ingredients is fed to a suitable reaction zone such as by pouring into a suitable mold or onto a moving conveyor belt where reaction proceeds. The foaming reaction is exothermic, and auxiliary heat is usually not necessary to effect the reaction, although it may be employed. After the reactants have been admixed for a period of between about 0.1 and about 20 seconds, an emulsion or "cream" forms. As the temperature increases from the reaction, gas bubbles are generated bringing about the formation of an uncured cellular gel material which usually cures fairly rapidly at room temperature. Once cured, the foam will be ready for use in various applications, such as seating, bedding, cushioning, etc.

Polyurethane foams prepared according to the process of the invention lend themselves to easy and fast processing by virtue of the fact that they become tack-free within a relatively short period of time after completion of the foaming reaction. These foams also have improved permeability inasmuch as they are substantially open-celled, i.e., more than 50 percent of their cells are open cells.

Furthermore, these foams are characterized by a combination of desirable properties. Ranging in density from about 1.3 to about 3.8, and preferably from about 1.6 to about 3.0, pounds per cubic foot, they have a SAC factor generally in excess of 2.4. The "SAC factor" is a measure of support provided by cushioning material. In accordance with the test described in ASTM D-1564-64T, it is expressed as the ratio of compression load deflection at 65 percent to 25 percent deflection. Thus by having a SAC factor of over 2.4, the foams of the invention, while being quite flexible and soft at the surface, exhibit little or no tendency to bottom out; and this property is achieved in the foams of the invention in the absence of fillers or other expedients which might alter the basic properties of the foam. The foams of the invention are also characterized by good tear strength, tensile strength and elongation properties.

By virtue of the combination of desirable physical porperties characterizing the polyurethane foams of the invention, these foams meet the rigid requirement set by the automotive industry for making molded auto seats. They are also of utility in numerous other cushioning applications such as in the manufacture of padding, seat cushions and the like.

The following examples are provided to illustrate the invention.

EXAMPLE 1

A flexible polyurethane foam was prepared from the following ingredients in the indicated proportions:

| Ingredients | Parts by Weight |
| --- | --- |
| Polyether polyol (1) | 100 |
| Triethylene diamine catalyst composition (2) | 0.6 |
| Toluene diisocyanate (3) | 45.0 |
| Stabilizing methylene-bridged diaryl polyisocyanate (4) | 3.0 |
| Water | 4.0 |
| Polydimethyl siloxane surfactant (5) | 0.6 |

1. This is a 4,625 molecular weight polyether triol prepared by the KOH catalyzed oxyalkylation of glycerol first with about 65 moles of propylene oxide and then with about 15 moles of ethylene oxide.
2. This catalyst composition, purchased commercially under the trademark "Dabco 33LV", consists essentially of ⅓ triethylene diamine and ⅔ dipropylene glycol by weight.
3. This is an isomeric mixture consisting of 80%, 2,4-toluene diisocyanate and 20% 2,6-toluene diisocyanate by weight.
4. This is an isomeric mixture of 2,4-diisocyanato-isocyanato-phenyl-methane and 2,6-diisocyanato-isocyanato-phenyl-methane prepared by the condensation reaction of phenylisocyanate with an isomeric mixture of α-chloro-2,4-toluene diisocyanate and α-chloro-2,6-toluene diisocyanate.
5. This surfactant was purchased commercially under the trademark "DC-200-5".

The above ingredients were mixed together and dispensed from a foaming machine into a square cardboard box. The foaming reaction took place instantly and was completed in less than 3 minutes. A uniform foam product was thus obtained which cured at room temperature without exhibiting any shrinkage or collapse. After measuring the core density of the foam, its physical properties were determined, namely, compression load deflection properties and SAC factor (as described above, per ASTM D-1564-64T), tensile strength, tear strength and elongation. The latter three properties were determined in accordance with the test described in ASTM 1564-64. The tensile strength, expressed in pounds per square inch, is a measure of the minimum tension per unit cross-sectional area, which must be exerted on a standard foam sample to cause it to snap or break. The tear strength is expressed in pounds per linear inch, and this indicates the force necessary to cause a one-inch tear in a standard foam sample. Finally the elongation, which is expressed as a percentage of original length of the sample, is a measure of the length that the sample can be stretched to before it breaks or snaps. The results of all these determinations are provided in Table 1 below.

COMPARATIVE EXAMPLE

The identical procedure of Example 1 was repeated except that no methylene-bridged diaryl polyisocyanate was used, and the proportion of toluene diisocyanate was increased to 48 parts in order to provide substantially the same proportion of total isocyanate in the reaction mixture. The foaming reaction took place instantly and was completed in less than 3 minutes. The foam produced, however, collapsed resulting in a sample unsuitable for use.

EXAMPLE 2

The identical procedure of Example 1 was followed except that 100 parts of a 5,340 molecular weight polyether triol prepared by the KOH catalyzed oxyalkylation of glycerol first with about 80 moles of propylene oxide and then with 15 moles of ethylene oxide was employed as the polyether polyol.

The resulting foam had a uniform appearance and no shrinkage or collapse was observed. The physical properties of the cured foam are provided in Table 1 below.

Table 1

| FOAM PHYSICAL PROPERTIES | | |
| --- | --- | --- |
| | Ex. 1 | Ex. 2 |
| Density (lbs./cu. ft.) | 1.63 | 1.62 |
| Compression Deflection Properties (lbs.) | | |
| at 25% deflection | .19 | .15 |
| at 65% deflection | .49 | .38 |
| SAC Factor | 2.51 | 2.47 |
| Tensile Strength (lbs./sq. in.) | 10.62 | 11.07 |
| Tear Strength (lbs./linear in.) | 0.89 | 1.04 |
| Elongation (%) | 100 | 130 |

Examples 1 and 2 show that polyurethane foam can be produced having high resilient properties at a density below 2.0 lbs./cu. ft. and which is stable against shrinkage or collapse by employing methylene-bridged diaryl polyisocyanates as stabilizers.

What is claimed is:

1. In a process for preparing polyurethane foam from a reaction mixture comprised of an organic polyisocyanate, a polyether polyol reactant characterized by (1) a molecular weight of at least about 4,000, (2) an aliphatic alcohol nucleus having from about 2 to about 8 hydroxyl groups, (3) polyoxyalkylene chain segments attached to said nucleus, and (4) a ratio of primary to secondary hydroxyl end groups ranging from about 1.5:1 to about 5.5:1, a foaming agent and a reaction catalyst, the improvement which comprises including in said reaction mixture a foam stabilizing proportion of a methylene-bridged diaryl polyisocyanate of the formula:

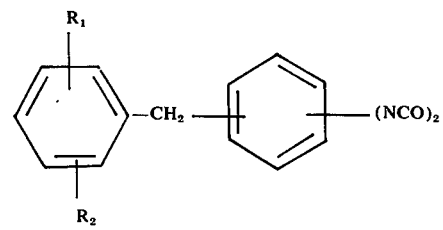

wherein $R_1$ is NCO or halogen, and
$R_2$ is H or an alkyl having 1–4 carbon atoms,
with the proviso that when $R_1$ is halogen, $R_2$ is an alkyl having 1–4 carbon atoms.

2. A polyurethane foam prepared by the process of claim 1.

3. The process of claim 1 wherein said polyether polyol has a molecular weight of from about 4,500 to about 7,000 and in which said ratio of primary to secondary hydroxyl end groups ranges from about 2:1 to about 5:1.

4. The process of claim 3 wherein said organic polyisocyanate is toluene diisocyanate.

5. The process of claim 4 wherein said methylene-bridged diaryl polyisocyanate is an isomeric mixture selected from the group consisting of a mixture of 2,4- and 2,6-diisocyanatophenyl-isocyanatophenyl-methane, a mixture of 2,4- and 2,6-diisocyanatophenyl-chloromethylphenyl-methane, and a mixture of 2,4- and 2,6-diisocyanatophenyl-chloroethylphenyl-methane.

6. The process of claim 5 wherein said foam stabilizing proportion ranges from about 1 to about 5 parts per 100 parts by weight of said polyether polyol.

7. A polyurethane foam prepared by the process of claim 6.

8. The process of claim 1 wherein said methylene-bridged diaryl polyisocyanate is represented by one of the following two formulas or a mixture thereof:

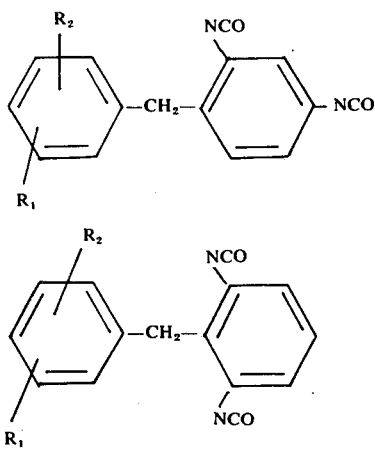

wherein, as applied to each of said formulas, R₁ is NCO or chlorine and R₂ is H, methyl or ethyl with the proviso that when R₁ is chlorine, R₂ is ethyl or methyl.

9. A polyurethane foam prepared by the process of claim 8.

10. The process of claim 8 wherein said methylene-bridged diaryl polyisocyanate is an isomeric mixture selected from the group consisting of
 a mixture of 2,4- and 2,6-diisocyanatophenyl-isocyanatophenyl-methane,
 a mixture of 2,4- and 2,6-diisocyanatophenyl-chloromethylphenyl-methane,
 a mixture of 2,4- and 2,6-diisocyanatophenyl-chloroethylphenyl-methane.

11. The process of claim 9 wherein said polyether polyol is an oxypropylated, oxyethylated aliphatic triol having a molecular weight of from about 4,500 to about 6,600 and in which said ratio of primary to secondary hydroxyl end groups ranges from about 3:1 to about 4.5:1.

12. The process of claim 10 wherein said organic polyisocyanate is an isomeric mixture of 2,4- and 2,6-toluene diisocyanate in which the weight ratio of the 2,4-isomer to the 2,6-isomer is from about 60:40 to about 90:10.

13. The process of claim 12 wherein said aliphatic triol is glycerol or trimethylolpropane.

14. The process of claim 13 wherein said reaction catalyst is a mixture of triethylene diamine and dipropylene glycol having a weight ratio of from about 1:2 to about 1:4 of said triethylene diamine to said dipropylene glycol.

15. A polyurethane foam produced by the process of claim 11.

16. The process of claim 14 wherein said methylene-bridged diaryl polyisocyanate is an isomeric mixture of 2,4- and 2,6-diisocyanatophenyl-isocyanatophenyl-methane.

17. A polyurethane foam produced by the process of claim 16 having a density of from about 1.3 to about 3.8 pounds per cubic foot.

* * * * *